US005606772A

United States Patent [19]
Ilic

[11] Patent Number: 5,606,772
[45] Date of Patent: Mar. 4, 1997

[54] ERGONOMIC HANDLE GRIP FOR TOOLS

[76] Inventor: Dragan Ilic, 104 Main St., Bloomingdale, N.J. 07403

[21] Appl. No.: 382,694

[22] Filed: Feb. 2, 1995

[51] Int. Cl.⁶ .............................. A46B 5/02; B25G 1/10; B25G 3/04; A01B 1/00
[52] U.S. Cl. ..................... 16/114 R; 16/111 R; 294/58; 15/145; 56/DIG. 18
[58] Field of Search ............................ 16/111 R, 114 R, 16/DIG. 12; 294/57, 58; 15/145, 143.1, 144.1; 56/400.17, DIG. 18; D4/129, 135, 138; D32/50–52

[56] References Cited

U.S. PATENT DOCUMENTS

| | | | |
|---|---|---|---|
| 758,482 | 4/1904 | Smith | 16/114 R |
| 1,391,726 | 9/1921 | Falos | 16/114 R |
| 1,762,718 | 6/1930 | Hervey | 294/57 |
| 1,796,249 | 3/1931 | Gillaspy | 16/114 R |
| 4,236,270 | 12/1980 | Mavis | 16/DIG. 12 |
| 4,704,758 | 11/1987 | Hoffman | 294/57 |
| 4,958,407 | 9/1990 | Johnson | 16/114 R |
| 5,065,475 | 11/1991 | Watt | 15/145 |
| 5,133,101 | 7/1992 | Hauser et al. | 294/58 |
| 5,153,966 | 10/1992 | Godwin | 16/111 R |

FOREIGN PATENT DOCUMENTS

| | | | |
|---|---|---|---|
| 531941 | 10/1954 | Belgium | 294/58 |
| 135100 | 11/1911 | United Kingdom | 294/58 |

Primary Examiner—M. Rachuba
Assistant Examiner—Donald M. Gurley
Attorney, Agent, or Firm—Salzman & Levy

[57] ABSTRACT

The present invention features a universal primary hand grip device for use with tools and utensils. The primary hand grip has multiple angles by which the hand can grip the shaft of a tool or utensil, thus making the grip ergonomically efficient. When used in combination with a secondary cross-handle, a tool or utensil can become quite easy to use and comfortable to operate. The primary hand grip device of this invention has a grip that slides over, or is made integral with, the end of the shaft of a tool or utensil. The hand grip has a multiply-angled surface, in which the primary hand can assume a substantially straight-angled position (180° angle) with respect to the axis of the wrist. The correct hand position varies with each tool and with each work surface. The proper grip angle for a particular task allows the hand to maintain a straight angle with respect to the wrist axis, while also imparting the driving force of the arm into the shaft of the tool.

8 Claims, 8 Drawing Sheets

ERGONOMIC HANDLE GRIP FOR TOOLS

FIELD OF THE INVENTION

The present invention pertains to handle grips for tools and utensils and, more particularly, to a universal handle grip for tools and utensils that allows the user to choose from a wide range of gripping positions. The handle grip devices of this invention also represent an ergonomic approach, resulting in a more convenient, more comfortable working environment for specific tasks, as well as for particular tools and utensils.

BACKGROUND OF THE INVENTION

Many different hand grips have recently been proposed for particular tools and utensils, in order to reduce hand fatigue and to provide for ease of use. Among the hand grips commonly in use for many tools and utensils, the cross-handle appears to be quite popular and useful. The cross-handle is illustrated in U.S. Pat No. 5,242,362 (roller); U.S. Pat. No. 5,188,362 and U.S. Pat. Nos. 4,982,960 (police batons); U.S. Pat. No. 5,054,830 (shovel); U.S. Pat. No. 3,773,375 (snow removal blade); U.S. Pat. No. 2,551,486 (golf-ball retrieving device); U.S. Pat. No. 2,536,607 (broom rake ); etc.

The cross-handle allows the user to wield a tool with a greater dexterity. It also provides for an improved facility by which a utensil may be gripped by the user's other hand. Cross-handles were designed for reducing fatigue in an assigned chore by allowing the wrist of the user's second hand to remain fairly straight, while still gripping the tool. Ergonomic studies have shown that poor angling of the wrist can, in certain circumstances, result in crippling and/or painful disorders (such as carpal-tunnel syndrome).

Despite improvements for the complementary hand as shown by cross-handles, little attention has been given to hand grips for the primary hand. In many cases, due to its various positions on each tool or utensil, the primary hand is more severely strained in the exercise of a task, since it is the primary hand which imparts the driving force of the arm into the movement of a tool, while the wrist is bent at an uncomfortable and inefficient angle.

The present invention reflects the discovery that every assigned task requires different angles of attack for the work surface. This often translates into requiring, for both complementary and primary hands alike, the handle of a tool to be gripped at different angles. This is particularly true when an angle of the work surface varies (for example, in the painting of floors, walls and ceilings).

The present invention provides a universal hand grip for the primary hand, one that can be adapted for use with many different tools and utensils and which is ergonomically efficient, even when work surface angles change.

The current invention reflects the knowledge that a single hand grip can provide many useful positions for the primary hand placed upon a tool or utensil. Due to its multiply-angled design, the primary handle grip of this invention can be used with, and placed upon, the shaft of almost any tool or utensil.

The primary handle grip of the invention can also be used in combination with the cross-handles of the aforementioned United States patents.

SUMMARY OF THE INVENTION

In accordance with the present invention, there is provided a universal primary hand grip device and method for use with tools and utensils. The primary hand grip has multiple angles by which the hand can grip the shaft of a tool or utensil, thus making the grip ergonomically efficient. When used in combination with a secondary cross-handle, a tool or utensil can become quite easy to use and comfortable to operate. The primary hand grip device of this invention comprises a grip that slides over, or is made integral with, the end of the shaft of a tool or utensil. The hand grip has a multiply-angled surface, wherein the primary hand can assume a substantially straight-angled position (180° angle) with respect to the axis of the wrist. The correct hand position varies with each tool and with each work surface. The proper grip angle for a particular task allows the hand to maintain a straight angle with respect to the wrist axis, while also imparting the driving force of the arm into the shaft of the tool. The ease by which the driving force is imparted thus allows the remainder of the work to be performed in a more efficient and comfortable manner so as to also reduce wrist fatigue.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the current hand grip device and method of this invention reflect the knowledge that, when performing a particular task, it is desirable to maintain a substantially straight wrist position with respect to a work tool or utensil. In order to achieve this, the inventive hand grip device is designed to have a multiplicity of grip angle surfaces. Different hand grip positions can be achieved when the angle of the work surface changes. This is accomplished while the primary (driving force) hand maintains a straight angle (180° angle) with respect to the wrist axis, whereby less stress is experienced in the carpal tunnel region of the wrist during the work assignment.

Figure 1:
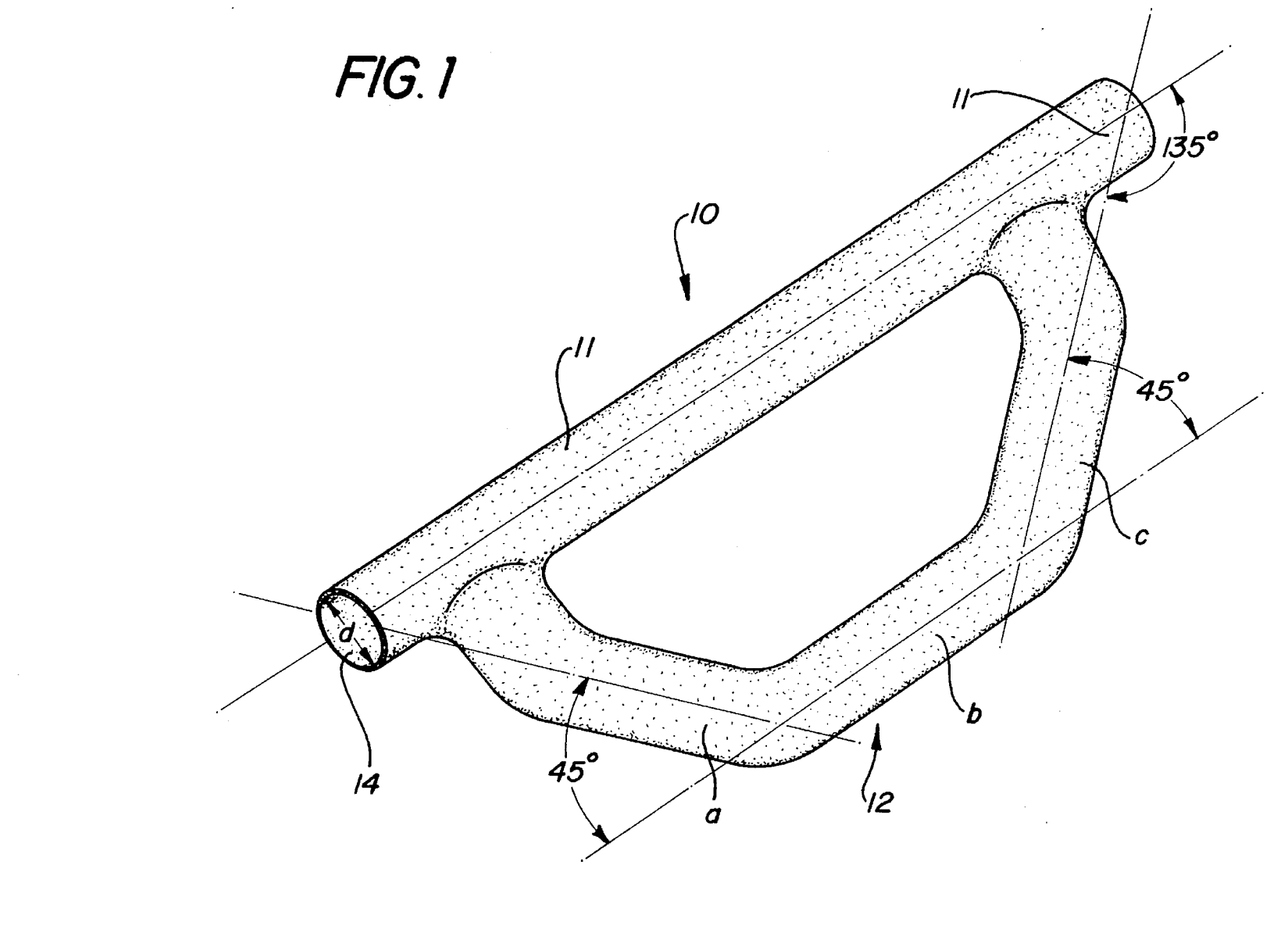
FIG. 1 illustrates a perspective view of a first embodiment of the multiply-angled, primary hand grip device of this invention.

Now referring to FIG. 1, a first embodiment of the hand grip device 10 of this invention is shown in perspective view. The hand grip device 10 comprises a hollow shaft 11 which is slid over the end of a shaft (not shown) of a utensil or tool. The hollow shaft 11 can be fabricated to be integral with a particular tool shaft; however, that limits the use of hand grip 10 only to that particular utensil.

The hand grip 10 can be made of a flexible rubber, so that the grip is soft to the touch. Sliding the nose 14 of hollow shaft 11 over the end of the tool shaft (not shown) is easily accomplished because the inner diameter "d" of the hollow shaft 11 can be of loose tolerance with respect to the tool shaft.

The grip portion 12 comprises a solid rubber gripping surface. The grip portion 12 is designed to have multiple grip angle surfaces "a" "b" and "c" respectively The respective multiple angles of surfaces a, b and c with respect to hollow shaft 11 are 45°, 180° and 135°.

Figure 3:
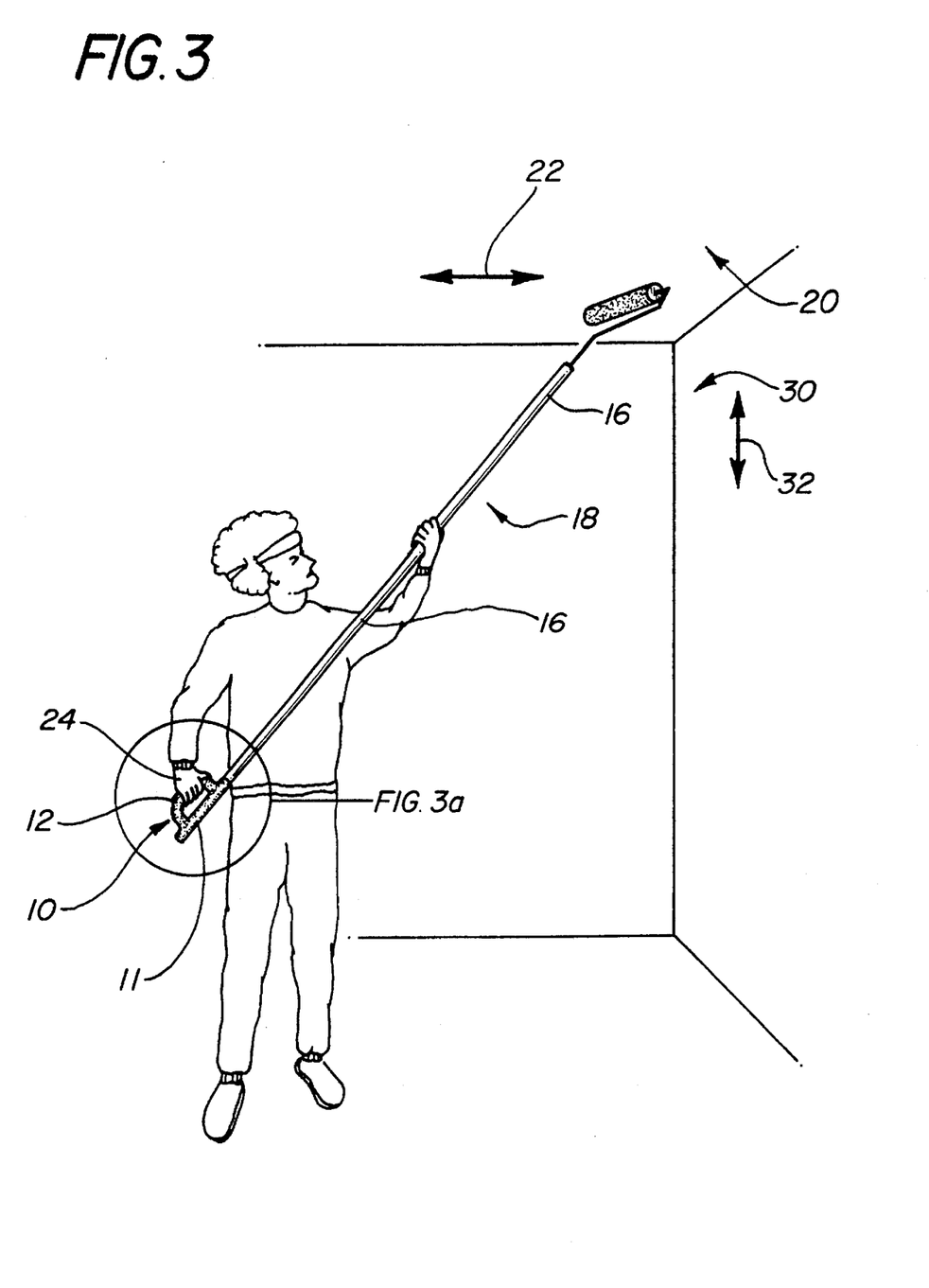
FIG. 3 shows a perspective, in situ view of the hand grip device of FIG. 1, as when being used to grip a paint roller tool when painting a ceiling.
Figure 3A:
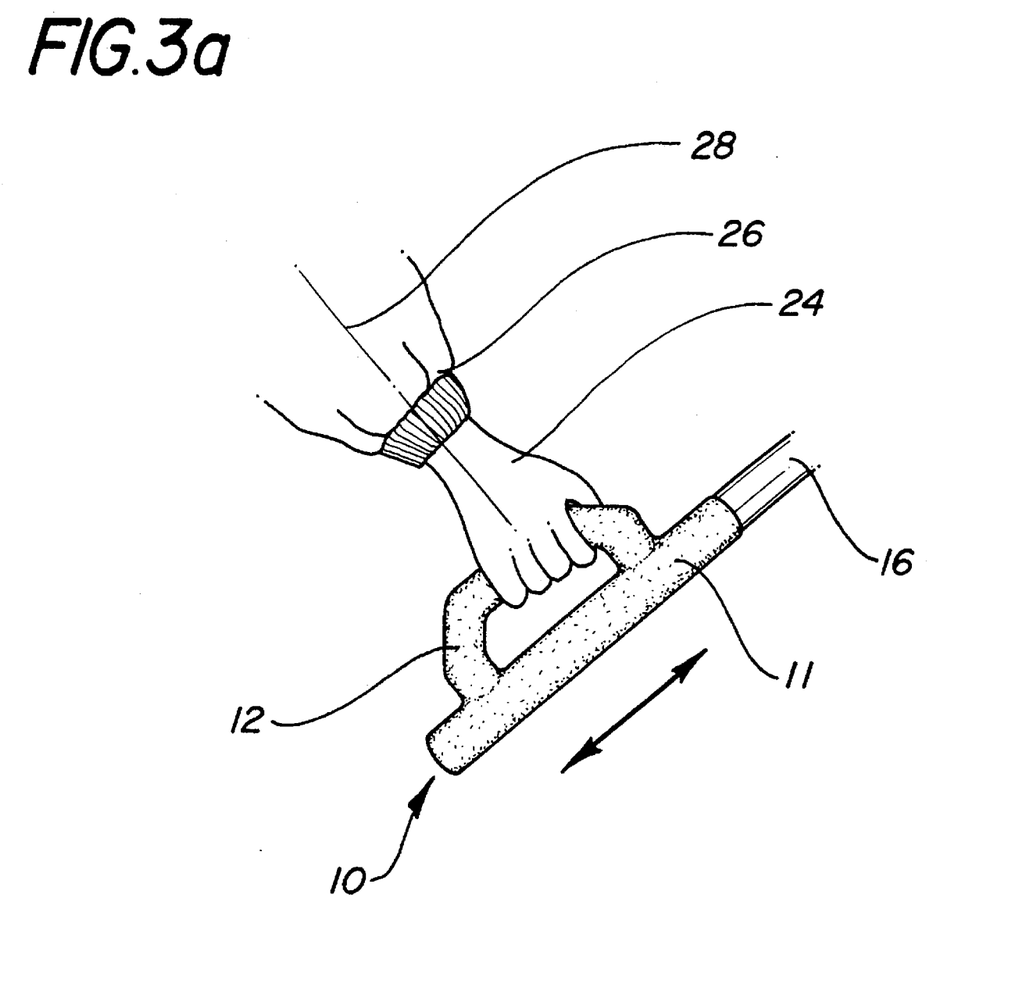
FIG. 3a depicts an enlarged view of the grip and hand grip device illustrated in FIG. 3.

Referring to FIGS. 3 and 3a, the hand grip 10 of FIG. 1 is shown attached to the end of shaft 16 of a paint roller tool 18. The instant task features the painting of a ceiling 20. In moving the roller back and forth (arrows 22) along the ceiling 20, the primary or driving hand 24 of the user is positioned on the gripping surface 10. The particular gripping portion 12 ("a" "b" or "c" respectively), which will allow the wrist 26 of hand 24 to maintain a straight angle along axis 28, is the proper grip for device 10. In painting the wall 30, the roller tool 18 will move up and down, as shown by arrows 32. This movement will cause a shift in the driving force angle of grip device 10, thus necessitating a change in the portion 12 of the grip surface that is gripped by the primary hand 24.

Figure 4:
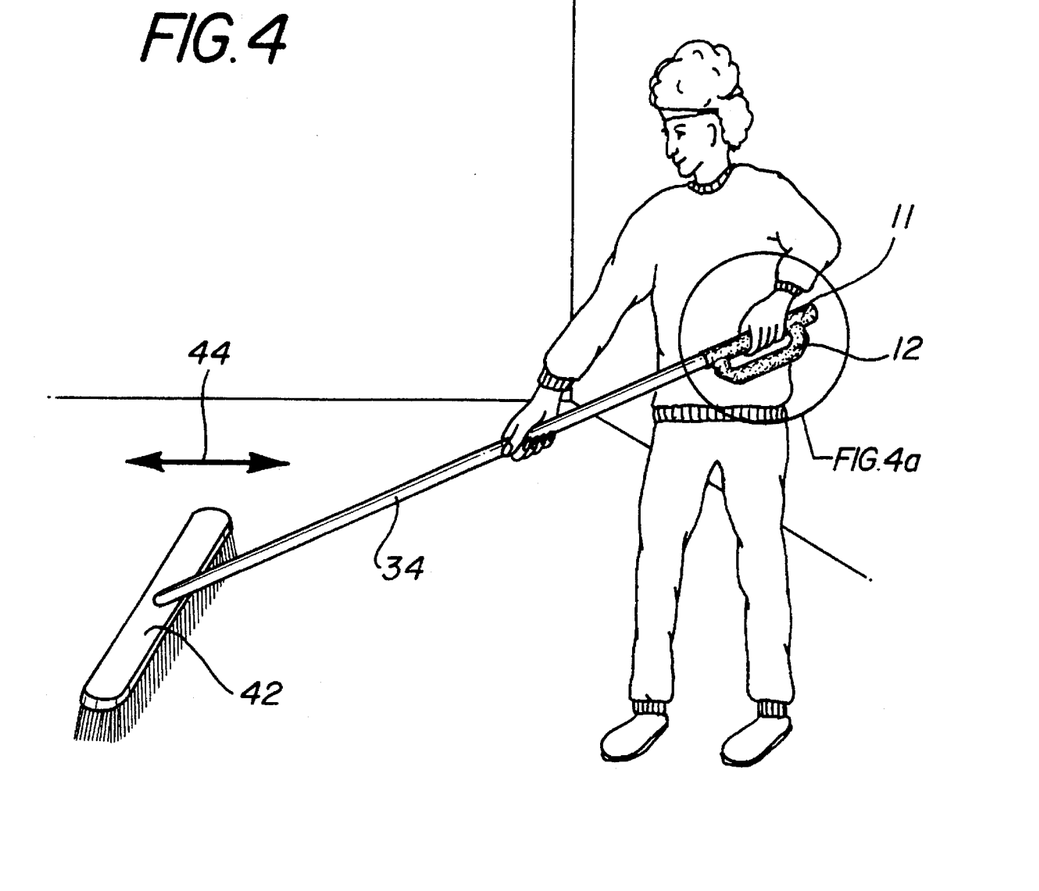
FIG. 4 illustrates a perspective, in situ view of the hand grip device of FIG. 1, as when being used to grip a broom when sweeping the floor.
Figure 4A:
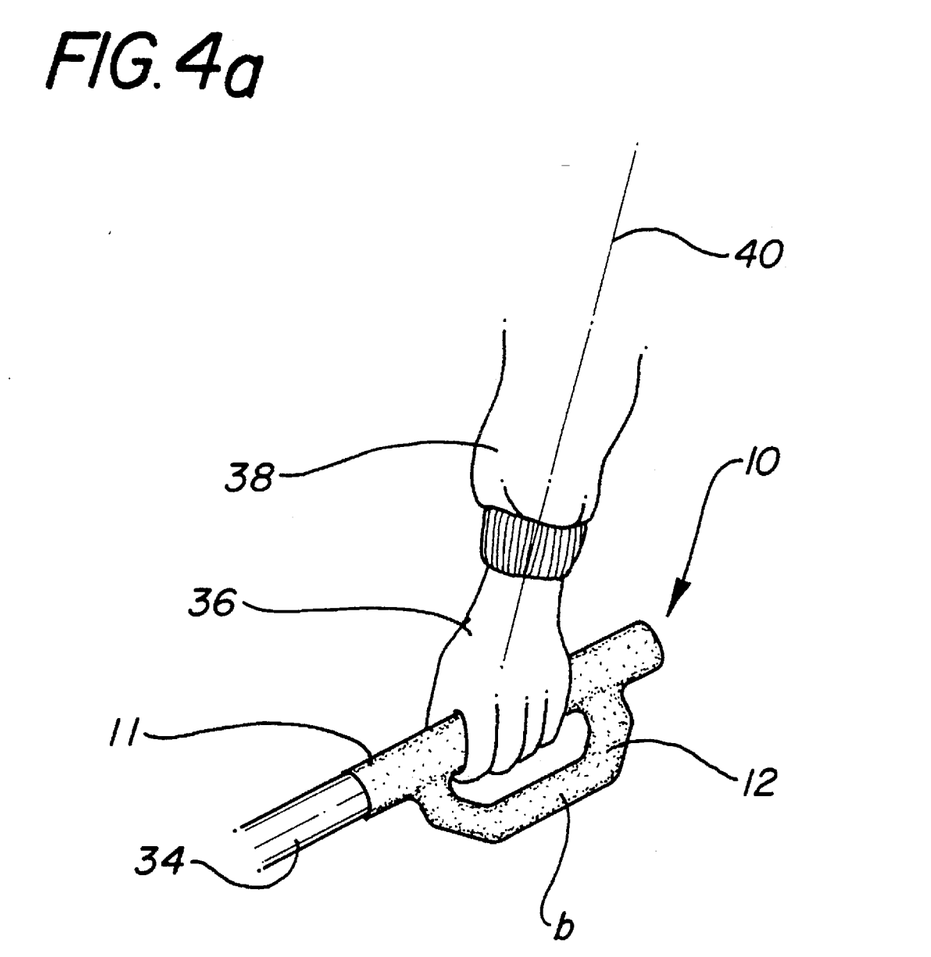
FIG. 4a shows an enlarged view of the grip and hand grip device illustrated in FIG. 4.

Referring to FIGS. 4 and 4a, the gripping device 10 is shown attached to the end of a broom shaft 34. As the head 42 of the broom is moved back and forth (arrows 44), the primary hand position 36 can grip the inner, hollow shaft 11 of the gripping device 10, or the "b" portion of grip portion 12, in order that the wrist 38 is maintained at a straight angle with respect to wrist axis 40.

Figure 2:
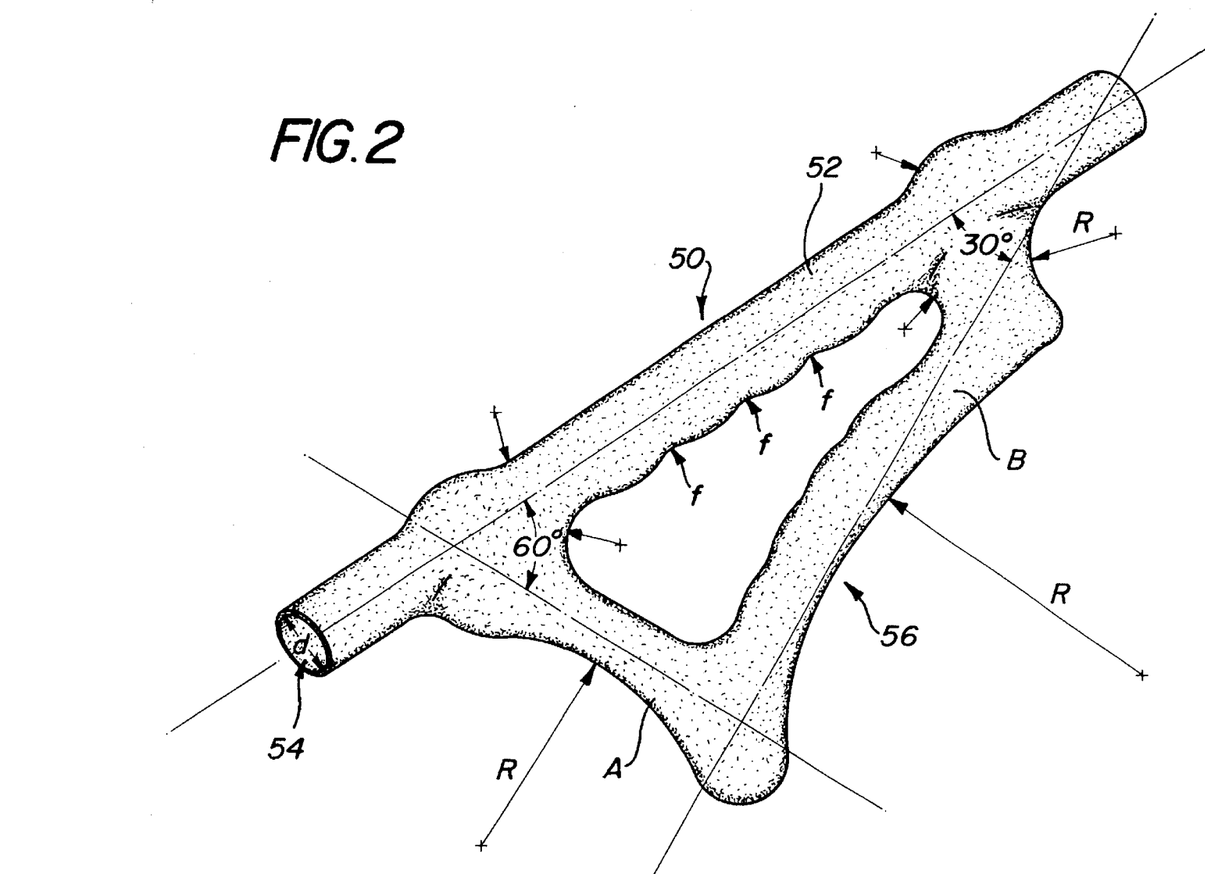
FIG. 2 depicts a perspective view of a second embodiment of the multiply-angled, primary hand grip device of this invention.

Now referring to FIG. 2, a second embodiment of the hand grip 10 of FIG. 1 is shown. The second embodiment features a hand grip 50 comprising a hollow sleeve 52, having a nose portion 54 that slides over an end portion of a tool shaft (not shown). The hand grip 50 comprises a grip portion 56 that is similar to the grip portion 12 of the hand grip 10 illustrated in FIG. 1. The grip portion 56 features two curved, solid grip portions "A" and "B", as shown. Portions "A" and "B" are each curved to provide a contoured gripping surface for the palm of a hand. Portion "A" is angled at approximately 60° with respect to the sleeve 52, and portion "B" is angled at approximately 30° thereto. The sleeve section 52 has indentations "f" that are shaped to contour the fingers of a gripped hand. The indentation feature can also be applied to grip portion "A" and "B", as well as the grip surfaces of the grip device 10 of FIG. 1. The hand grip device 50 can likewise be fabricated of rubber.

Figure 5:
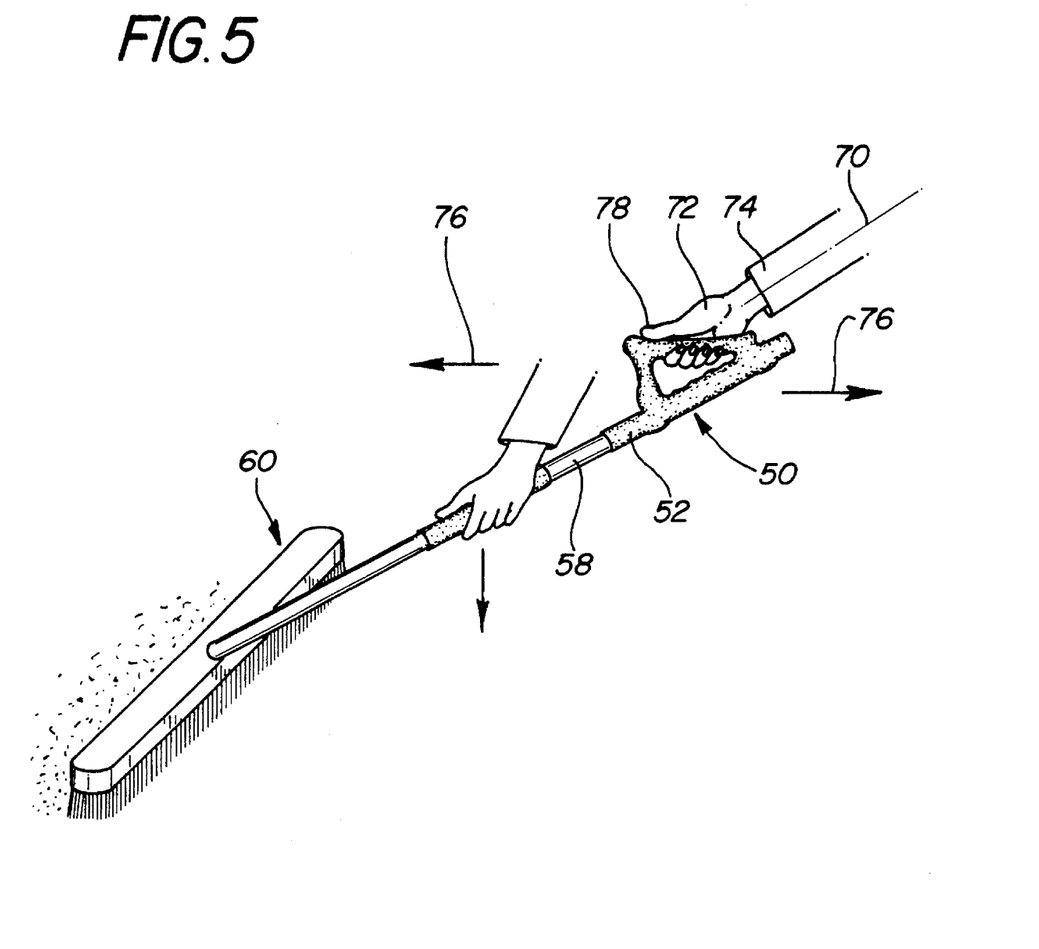
FIG. 5 illustrates a perspective, in situ view of the hand grip device of FIG. 2, as when being used to grip a broom when sweeping the floor.

Referring to FIG. 5, the handle grip 50 of FIG. 2 is shown in situ with respect to a broom utensil 60. The grip handle device 50 is shown with its sleeve 52 disposed over the broom shaft 58. Moving the broom 60 back and forth (arrows 76) can be accomplished by gripping the hand grip 50 about portion "B" with the hand 72, as shown. It will be observed that the hand 72 makes a straight angle (180°) with the wrist axis 70, thereby resulting in less stress upon the carpal tunnel of wrist 74. It will also be observed that the contour of portion "B" provides an added grip control by which the thumb 78 of the hand 72 can push the broom 60.

Figure 6:
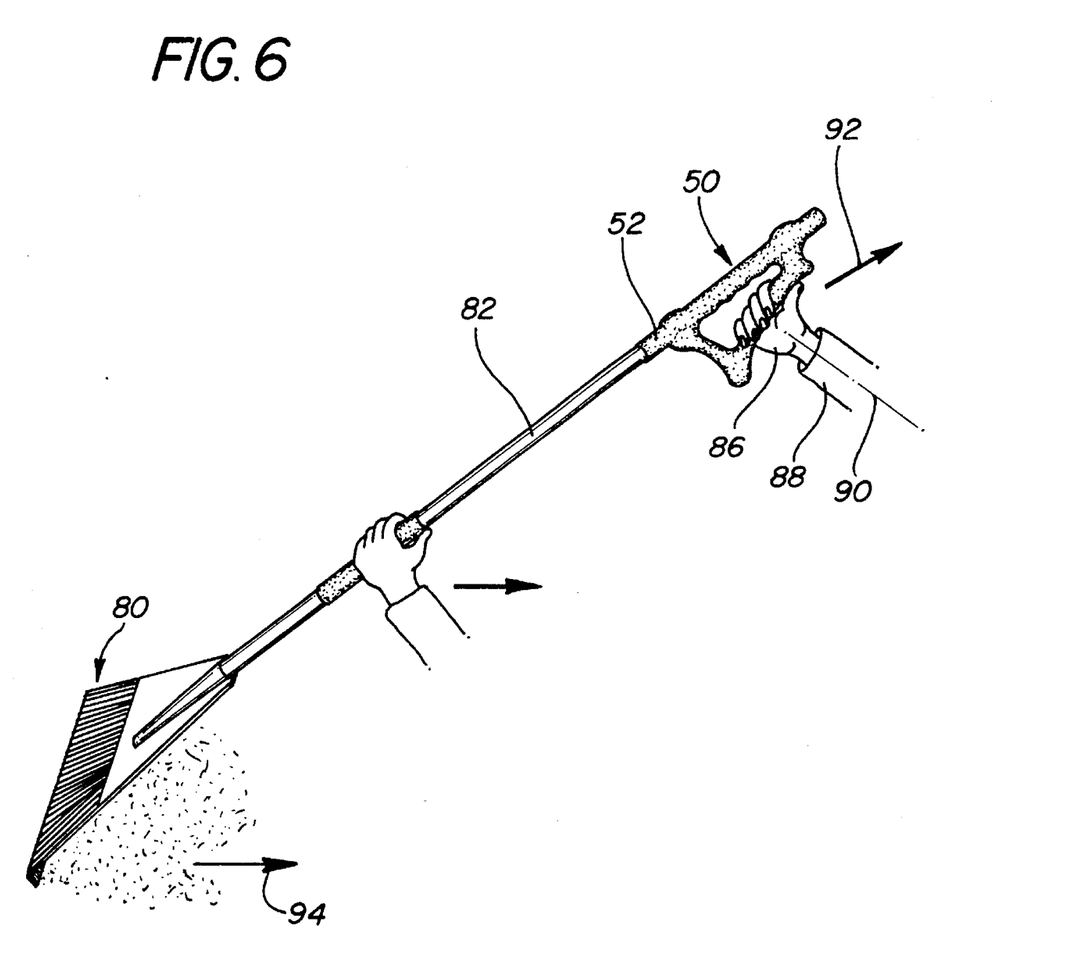
FIG. 6 depicts a perspective, in situ view of the hand grip device of FIG. 2, as when being used to grip a leaf rake when raking the lawn of leaves.

Referring to FIG. 6, the hand grip 50 is illustrated in situ with a leaf rake tool 80. The hand grip sleeve 52 is slipped over the shaft 82 of the rake 80, as shown. The primary hand 86 is depicted gripping portion "B" and pulling backwardly (arrow 92), in order to move the rake 80 backwardly (arrow 94). It will be observed that the hand 86 makes a straight angle with respect to the wrist axis 90, thereby resulting in less stress upon the carpal tunnel of wrist 74.

Portion "A" of hand grip device 50 can also be used in situations similar to that depicted for the roller 18 that is illustrated in FIG. 3. Using either embodiment, many different grips can be configured with a wide variety of tools, utensils and surface angles, as befits the intent of this invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A hand grip device disposed at an end portion of a tool or utensil for gripping the tool or utensil by a hand that imparts driving motion to said tool or utensil, comprising a shaft portion disposed over an end portion of said tool or utensil, and an ergonomic, solid grip portion adjacent said shaft portion, said solid grip portion having a surface containing multiple-angle grip sections for gripping the tool or utensil at different angles of attack with respect to a work surface, whereby the hand can assume a substantially straight-angled position (180° angle) with respect to an axis of the wrist of said hand, while imparting a driving force to the tool or utensil, and additionally whereby a fatigue condition in said wrist, such as carpal tunnel syndrome, can be avoided because the wrist can avoid assuming a substantially bent position when the hand grips said solid grip portion at an angle of 180° with respect to said axis of said wrist, said surface of said solid grip portion forming a substantially semi-circular, closed loop with said shaft portion, and including in sequence a 45-degree, angled portion with respect to said shaft portion, followed by a substantially straight portion that is Substantially parallel to said shaft portion followed still by a 135-degree, angled portion with respect to said shaft portion for completing said substantially semi-circular, closed loop.

2. The hand grip device in accordance with claim 1, wherein said shaft portion comprises a substantially hollow sleeve that slips over an end portion of said tool or utensil.

3. The hand grip device in accordance with claim 1, wherein said shaft portion comprises contour surfacing for conforming to a grip of the hand.

4. The hand grip device in accordance with claim 1, wherein said solid grip portion comprises curved surfacing for conforming to a grip of the hand.

5. A hand grip device integrally disposed upon an end portion of a shaft of a tool or utensil for gripping the tool or utensil by a hand that imparts driving motion to said tool or utensil, said hand grip device comprising a shaft portion and an ergonomic grip portion adjacent said shaft portion, said grip portion having a surface containing multiple-angle grip sections for gripping the tool or utensil at different angles of attack with respect to a work surface, whereby the hand can assume a substantially straight-angled position (180° angle)

with respect to an axis of the wrist of said hand, while imparting a driving force to the tool or utensil, and additionally whereby a fatigue condition in said wrist, such as carpal tunnel syndrome, can be avoided because the wrist can avoid assuming a substantially bent position when said hand grips said solid grip portion at an angle of 180° with respect to said axis of said wrist, said surface of said solid grip portion forming a triangularly,shaped, closed loop with said shaft portion, and including in sequence a 60-degree, angled portion with respect to said shaft portion, followed by a substantially straight portion that intersects said shaft portion at an angle of 30 degrees and which makes a right angle with respect to said 60-degree portion, thereby completing said triangularly-shaped, closed loop.

6. The hand grip device in accordance with claim 5, wherein said shaft portion comprises a substantially hollow sleeve that slips over an end portion of said tool or utensil.

7. The hand grip device in accordance with claim 5, wherein said shaft portion comprises contour surfacing for conforming to a grip of the hand.

8. The hand grip device in accordance with claim 5, wherein said grip portion comprises curved surfacing for conforming to a grip of the hand.

* * * * *